Nov. 30, 1937.                 H. H. BONN, JR                    2,100,936
                           SPEED CHANGING DEVICE
                         Filed April 24, 1935          2 Sheets—Sheet 1
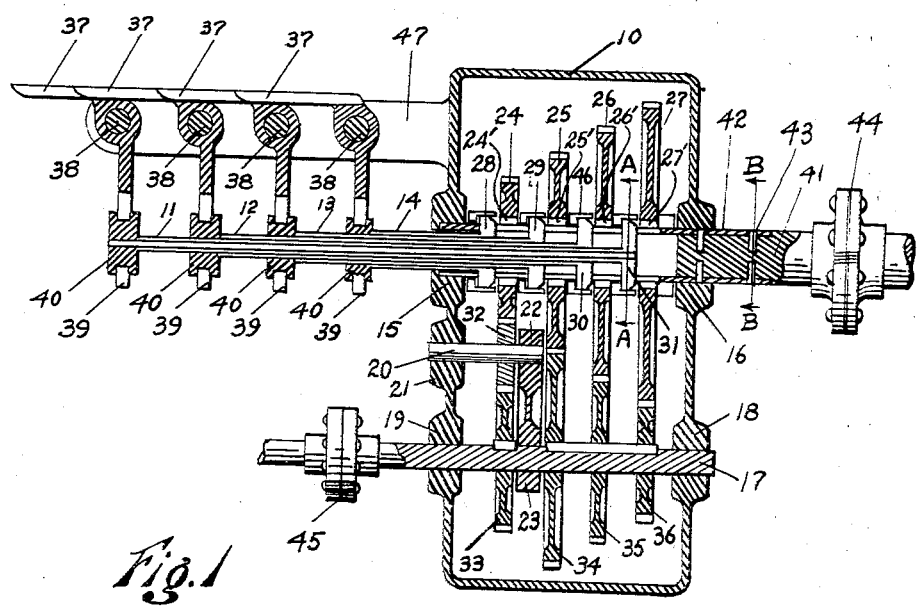
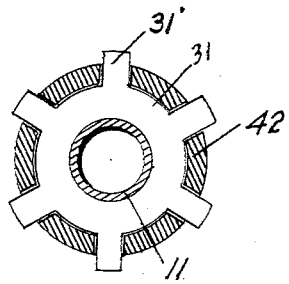
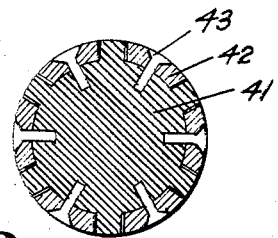
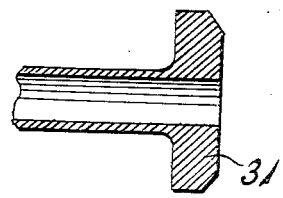
INVENTOR.
Henry H. Bonn Jr.
BY John E. Baup
ATTORNEY.

Nov. 30, 1937.  H. H. BONN, JR  2,100,936
SPEED CHANGING DEVICE
Filed April 24, 1935  2 Sheets-Sheet 2
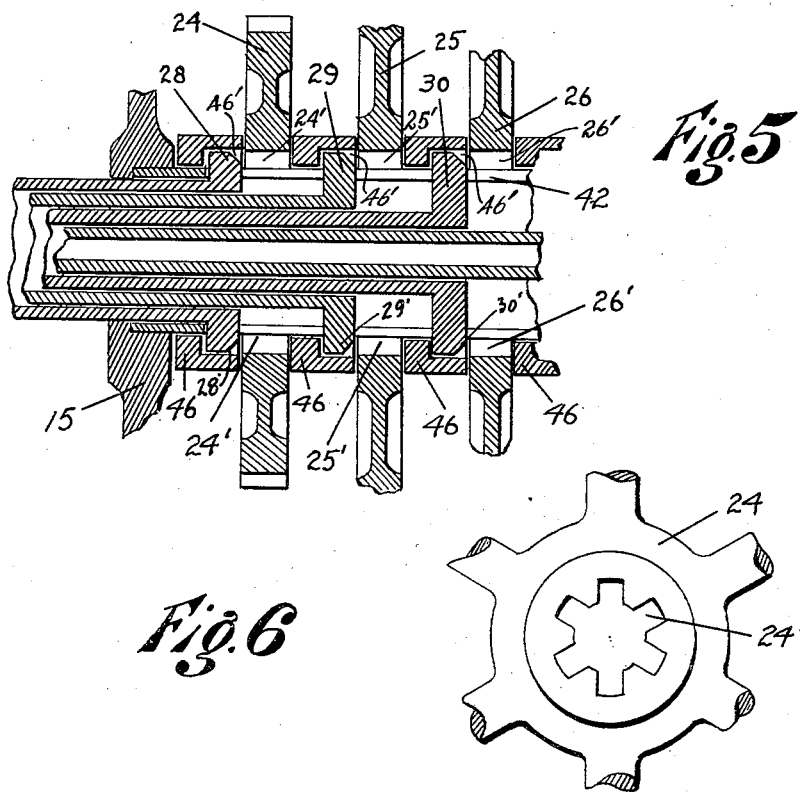
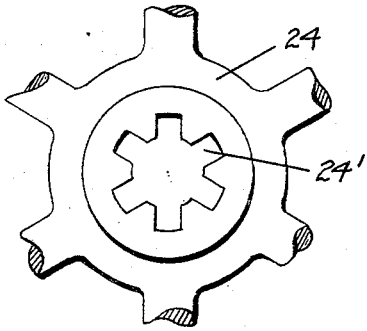
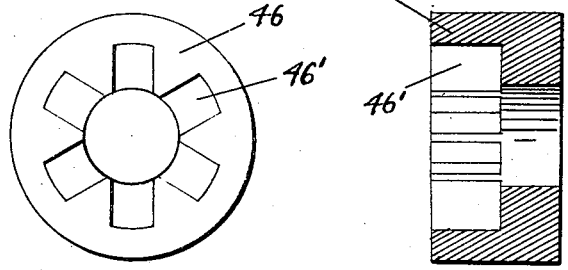
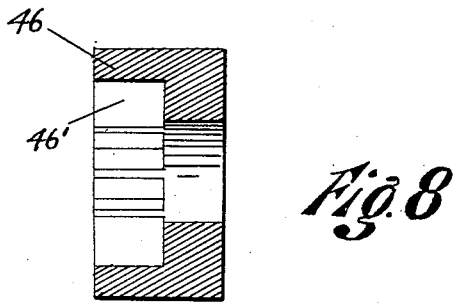
INVENTOR.
BY Henry H. Bonn Jr.
John F. Baugh
ATTORNEY.

Patented Nov. 30, 1937

2,100,936

UNITED STATES PATENT OFFICE 2,100,936

SPEED CHANGING DEVICE

Henry H. Bonn, Jr., Milwaukee, Wis.

Application April 24, 1935, Serial No. 18,045

2 Claims. (Cl. 74—363)

This invention relates to improvements in speed changing devices and particularly to such mechanism as may be readily installed and used in automobiles or the like.

An object of my invention is to provide a speed changing device in which, though all revolving members maintain contact with one another, only one set of members are engaged to do the driving.

A further object of my invention is to provide a speed changing mechanism that is compact in design consisting of a minimum number of parts, economical to construct, adaptable to many uses and simple to operate.

The invention is fully disclosed in the following specification of which the accompanying drawings are a part and in which the separate parts of my improvements are disclosed by suitable reference characters in each of the views and in which Fig. 1 shows a fragmentary cross sectional view of an entire assembly.

Fig. 2 is a cross sectional view of the splined collar at the line AA in Fig. 1.

Fig. 3 is a cross sectional view of the drive shaft and end portion at line BB in Fig. 1.

Fig. 4 is a cross sectional view of a splined collar.

Figure 5 is a fragmentary cross sectional view of the shaft, gear, and collar arrangement, illustrating the manner in which the keys slidably engage the recesses and ways in the collars and gears, and also the manner in which the collars act as spacers between the gears.

Figure 6 is a fragmentary view of the hub section of one of the gears showing the keyway arrangement.

Figure 7 is a plan view of a spacing collar, and

Figure 8 is a cross sectional view of a spacing collar showing the keyway arrangement.

Similar characters of reference indicate corresponding parts throughout the several views and referring to same, character 10, portrays a casing in which the drive shaft 42, enclosing an assembly of concentric hollow shafts 11, 12, 13 and 14, is mounted horizontally, supported by bearings 15 and 16. There is a driven shaft 17, running parallel to the drive shaft 42, and mounted in bearings 18 and 19. An intermediate shaft 20, is journalled at one end in a bearing 21 mounted in a side wall of the casing 10, and at its other end in a bearing 22 which is integral with a supporting bearing 23 that is loosely engaged on the driven shaft 17.

The characters 24, 25, 26, and 27, represent driven gears loosely mounted on the shaft 42, and spaced by the loosely mounted shaft collars 46, said collars provided with keyways 46'. These said gears are provided with a plurality of keyways 24', 25', 26', and 27', and mesh with the gears 33, 34, 35 and 36, which are keyed to, and are rigidly mounted to the driven shaft 17. The intermediate gear 32, loosely mounted on the jack shaft 20, meshes with gears 24 and 33.

The hollow shafts 11, 12, 13 and 14, are a part of the drive shaft assembly, and have collars 28, 29, 30 and 31 provided with a plurality of keys 28'—31' attached on one end of the hollow shafts for contact with the drive gears 24, 25, 26 and 27, respectively, and grooved collar 40, on the other end for engagement with the yoked section 39, of the angularly disposed shifting lever 37, pivotally mounted at 38, on the horizontal support arm 47, shown integral with the casing 10.

The splined end portion 41, of the drive shaft 42, fastened by means of screws or pins 43, connects the drive shaft with the motor shaft by means of any conventional type of coupling indicated by character 44, while the driven shaft 17, is connected to the shaft of the driven unit by means of a coupling as indicated by the numeral 45.

In operation the mechanism functions in the following manner. The coupling 44, engages the revolving drive shaft 42, enclosing an assembly of concentric sleeves 11, 12, 13 and 14, to the shaft of the power producing unit. This entire assembly revolves freely when in a neutral position due to the splined collars 28, 29, 30, and 31, in the ends of the hollow shafts 11, 12, 13, and 14, being shifted to move the keys 28'—31' into the recesses 46' of the spacer collars 46 which collars are free to revolve with the shaft. When one of the angularly disposed shifting levers 37 is forced down, the yoked lever 39, contacting one of the grooved collars 40, mounted on any one of the horizontally disposed tubular shafts 11, 12, 13 and 14, causes the same to slide forward, and the splined collar on the forward end of the tubular shaft engages the keyways 24', 25', 26', and 27' in one of the gears 24, 25, 26 and 27. This will immediately bring the gear into motion and as all gears are in mesh at all times, the drive gear that has the splined collar engaged will do the driving, and the ratio of this gear to the gear which it is driving, and which is permanently mounted on the driven shaft, will determine the speed of the driven shaft.

For example: If one of the levers 37, is brought down into place it will cause the tubular shaft 11, having the splined collar 31, on its forward end, to be brought into direct contact with the keyways in the gear 27, engaging the same and bringing the gear into motion. This gear 27, meshed at all times with the smaller gear 36, on the driven shaft, will cause the same to rotate in direct ratio with the number of teeth as compared with the gear 27, controlling the speed of the driven shaft. All other gears being in mesh, but not engaged, will rotate freely, but without effort on the drive shaft.

If reverse motion is desired, the tubular shaft 14, is brought forward and the splined collar 28, engages the keyway 24' in the gear 24, causing the same to rotate with the shaft 14 and being meshed as is shown with the intermediate gear 32, which in turn is meshed with the driven gear 33, will cause the gear 33, to rotate the driven shaft 17, in ratio with the drive gear 24. Again all other gears, even though in mesh, will revolve freely without any direct effect on the reversed driving mechanism.

The shifting of the tubular shafts, may be accomplished in any suitable manner, either manually, pneumatically, hydraulically or electrically. The actuating power has no effect on the shifting mechanism.

I have entered into a detailed description of the construction and relative arrangement of parts embraced in the present and preferred embodiments of my invention, in order to impart a full, clear and exact understanding of said embodiments. I do not desire, however, to be understood as confining myself to the said specific construction and relative arrangement of parts inasmuch as in the future practice of the invention, various changes and modifications may be made, such as fall within the scope of the invention as defined by my appended claims.

Having thus described my invention, what I claim and desire to secure by Letters Patent in the United States, is:

1. A device of the character described, comprising a casing, a tubular drive shaft extending inwardly of one side of said casing, a driven shaft extending inwardly of the opposite side of said casing, gears loosely mounted on said drive shaft within said casing, gears rigidly mounted on said driven shaft and meshing with the gears on said drive shaft, nested tubular members extending into said casing and inwardly of the inner end of said tubular drive shaft, the opposite ends of said tubular members being offset one from the other, keys carried at the inner ends of said tubular members, said drive shaft having longitudinal slots engaged by said keys, each of said loosely mounted gears having a plurality of ways to receive said keys, and means engaging the outer ends of said tubular members to selectively shift the same to move said keys into and out of engagement with said ways.

2. A device of the character described, comprising a casing, a tubular drive shaft extending inwardly of one side of said casing, a driven shaft extending inwardly of the opposite side of said casing, gears loosely mounted on said drive shaft within said casing, gears rigidly mounted on said driven shaft and meshing with the gears on said drive shaft, spacer collars mounted on said drive shaft between the first named gears, nested tubular members extending into said casing and inwardly of the inner end of said drive shaft, radial keys carried at the inner ends of said tubular members at right angle thereto, said drive shaft having longitudinal slots engaged by said keys, each of said loosely mounted gears having a plurality of ways to receive said keys to operatively connect said drive shaft thereto, said spacer collars having recesses therein to receive said keys when the same are disengaged from the ways in said gears, and means engaging said tubular members to selectively shift the same to move said keys into and out of engagement with the said ways.

HENRY H. BONN, Jr.